US011531595B2

(12) United States Patent
Horowitz

(10) Patent No.: US 11,531,595 B2
(45) Date of Patent: Dec. 20, 2022

(54) NON-BLOCKING SECONDARY READS

(71) Applicant: MongoDB, Inc., New York, NY (US)

(72) Inventor: Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 727 days.

(21) Appl. No.: 16/442,355

(22) Filed: Jun. 14, 2019

(65) Prior Publication Data

US 2019/0391881 A1 Dec. 26, 2019

Related U.S. Application Data

(60) Provisional application No. 62/687,618, filed on Jun. 20, 2018.

(51) Int. Cl.
*G06F 11/14* (2006.01)
(52) U.S. Cl.
CPC ...... *G06F 11/1451* (2013.01); *G06F 2201/80* (2013.01); *G06F 2201/82* (2013.01); *G06F 2201/84* (2013.01)
(58) Field of Classification Search
None
See application file for complete search history.

(56) References Cited

U.S. PATENT DOCUMENTS

| | | | | |
|---|---|---|---|---|
| 6,694,413 B1* | 2/2004 | Mimatsu | ............. | G06F 11/1466 707/999.204 |
| 7,774,568 B2* | 8/2010 | Sudhakar | ............ | G06F 11/1471 707/657 |
| 7,836,266 B2* | 11/2010 | Zohar | ................. | G06F 11/1458 711/170 |
| 8,037,264 B2* | 10/2011 | Koning | ............... | G06F 11/1464 707/639 |
| 9,594,583 B2* | 3/2017 | Bonzini | ............. | G06F 9/45558 |
| 2016/0314162 A1* | 10/2016 | Tarta | .................... | G06F 16/2456 |
| 2019/0325055 A1* | 10/2019 | Lee | ........................ | G06F 3/0644 |

\* cited by examiner

*Primary Examiner* — Belix M Ortiz Ditren
(74) *Attorney, Agent, or Firm* — Wolf, Greenfield & Sacks, P.C.

(57) ABSTRACT

Described herein are embodiments of a database system. The database system receives a read command to read at least some stored data. The database system may generate a plurality of snapshots of data stored in a first data storage node of a plurality of data storage nodes. The database system may determine whether data is being written to the first data storage node. Responsive to determining that data is not being written to the first data storage node, the database system may process the read command at least in part by reading at least some data stored on the first data storage node. Responsive to determining that data is being written to the first data storage node, the database system may process the read command at least in part by reading at least some data from a snapshot of the plurality of snapshots.

20 Claims, 12 Drawing Sheets

NON-BLOCKING SECONDARY READS

RELATED APPLICATIONS

This application is a Non-Provisional of Provisional (35 USC 119(e)) of U.S. Application Ser. No. 62/687,618, filed Jun. 20, 2018, entitled "NON-BLOCKING SECONDARY READS", which is incorporated herein by reference in its entirety.

BACKGROUND

Databases may include multiple disks to store redundant data. The redundant storage of data in multiple disks may improve the rate at which data can be read from the database by spreading out read requests over multiple disks or systems. Further, the redundant storage of data may improve uptime of the database by making the database more robust to failures.

SUMMARY

Described herein are embodiments of a database system that allows processing of read commands on target data while a write command is being applied to the target data. The database system receives a read command to read target data. The database system may maintain a plurality of snapshots of data stored in the database. The database system may determine whether a write command is being applied to the target data. Responsive to determining that data is not being applied to the target data, the database system may process the read command by applying the read command to the target data. Responsive to determining that a write command is being applied to the target data, the database system may process the read command by reading a snapshot maintained by the database system.

According to at least one aspect, a database system is provided. The database system comprises a database comprising a plurality of data storage nodes, the plurality of data storage nodes including a primary storage node and a plurality of secondary storage nodes, at least one processor configured to execute a plurality of system components. The system components comprise an interface component configured to receive at least one write command to write data to the database and at least one read command configured to read data from the database, a snapshot component configured to generate a plurality of snapshots of data stored in a secondary data storage node of the plurality of secondary storage, and a command processing component configured to: apply the at least one write command to the secondary storage node; and read, at least partially in parallel with the at least one write command being applied to the secondary storage node, at least some data from a snapshot of the plurality of snapshots.

In some embodiments, the snapshot component is configured to identify a committed snapshot representative of data that has been replicated on a majority of the plurality of data storage nodes. In some embodiments, the command processing component is configured to read the at least some data from the committed snapshot.

In some embodiments, each snapshot of the plurality of snapshots corresponds to the data stored in the secondary storage node at a unique point in time. In some embodiments, database follows an eventual consistency model. In some embodiments, the primary data storage node includes an operation log and the secondary data storage nodes are configured to retrieve the operation log and replicate operations in the operation log.

In some embodiments, the command processing component is configured to lock at least a portion of data while applying the at least one write command to the secondary node. In some embodiments, the snapshot component is configured to generate snapshots periodically. In some embodiments, the snapshot component is configured to generate a snapshot every 10 ms.

In some embodiments, the command processing component is configured to apply a write command by applying a batch of one or more write operations to data hosted by the secondary storage node. In some embodiments, the snapshot component is configured to generate a snapshot representative of data where the batch of one or more write operations has been applied by a predetermined number of the plurality of data storage nodes.

According to at least one aspect, a method of performing operations in a database comprising a plurality of storage nodes is provided. The method comprises receiving, by an interface component executed by at least one processor, at least one write command to write data to the database and at least one read command configured to read data from the database; generating, by a snapshot component executed by the at least one processor, a plurality of snapshots of data stored in a secondary data storage node of the plurality of secondary storage; applying, by a command processing component executed by the at least one processor, the at least one write command to the secondary storage node; and reading, by the command processing component at least partially in parallel with the at least one write command being applied to the secondary storage node, at least some data from a snapshot of the plurality of snapshots.

In some embodiments, the method further comprises identifying, by the snapshot component, a committed snapshot representative of data that has been replicated on a majority of the plurality of storage nodes. In some embodiments, the method further comprises reading, by the command processing component, at least some data from the committed snapshot. In some embodiments, the method further comprises associating, by the snapshot component, each of the plurality of snapshots with a timestamp.

According to at least one aspect, a database system is provided. The database system comprises at least one processor configured to execute a plurality of system components. The system components comprise: an interface component configured to receive a read command to read at least some stored data, a snapshot component configured to generate a plurality of snapshots of data stored in a first data storage node of a plurality of data storage nodes, and a command processing component configured to: determine whether data is being written to the first data storage node; responsive to determining that data is not being written to the first data storage node, processing the read command at least in part by reading at least some data stored on the first data storage node; and responsive to determining that data is being written to the first data storage node, processing the read command at least in part by reading at least some data from a snapshot of the plurality of snapshots.

In some embodiments, the command processing component is configured to determine whether data is being written to the first data storage node by determining whether target data of the read command is locked. In some embodiments, processing the read command by reading at least some data from a snapshot of the plurality of snapshots comprises reading the at least some data from the most recently generated snapshot. In some embodiments, the interface component is configured to receive a plurality of read commands and the command processing component is configured to process the plurality of read commands by reading data from the snapshot in response to determining that data is being written to the first data storage node.

According to at least one aspect, a method of performing operations in a database comprising a plurality of storage nodes is provided. The method comprises receiving, by an interface component executed by at least one processor, a read command to read at least some stored data; generating, by a snapshot component executed by the at least one processor, a plurality of snapshots of data stored in a first data storage node of the plurality of data storage nodes; determining, by a command processing component executed by the at least one processor, whether data is being written to the first data storage node; and processing, by the command processing component, the read command at least in part by reading at least some data stored on the first data storage node responsive to determining that data is not being written to the first data storage node; and processing, by the command processing component, the read command at least in part by reading at least some data from a snapshot of the plurality of snapshots responsive to determining that data is being written to the first data storage node.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
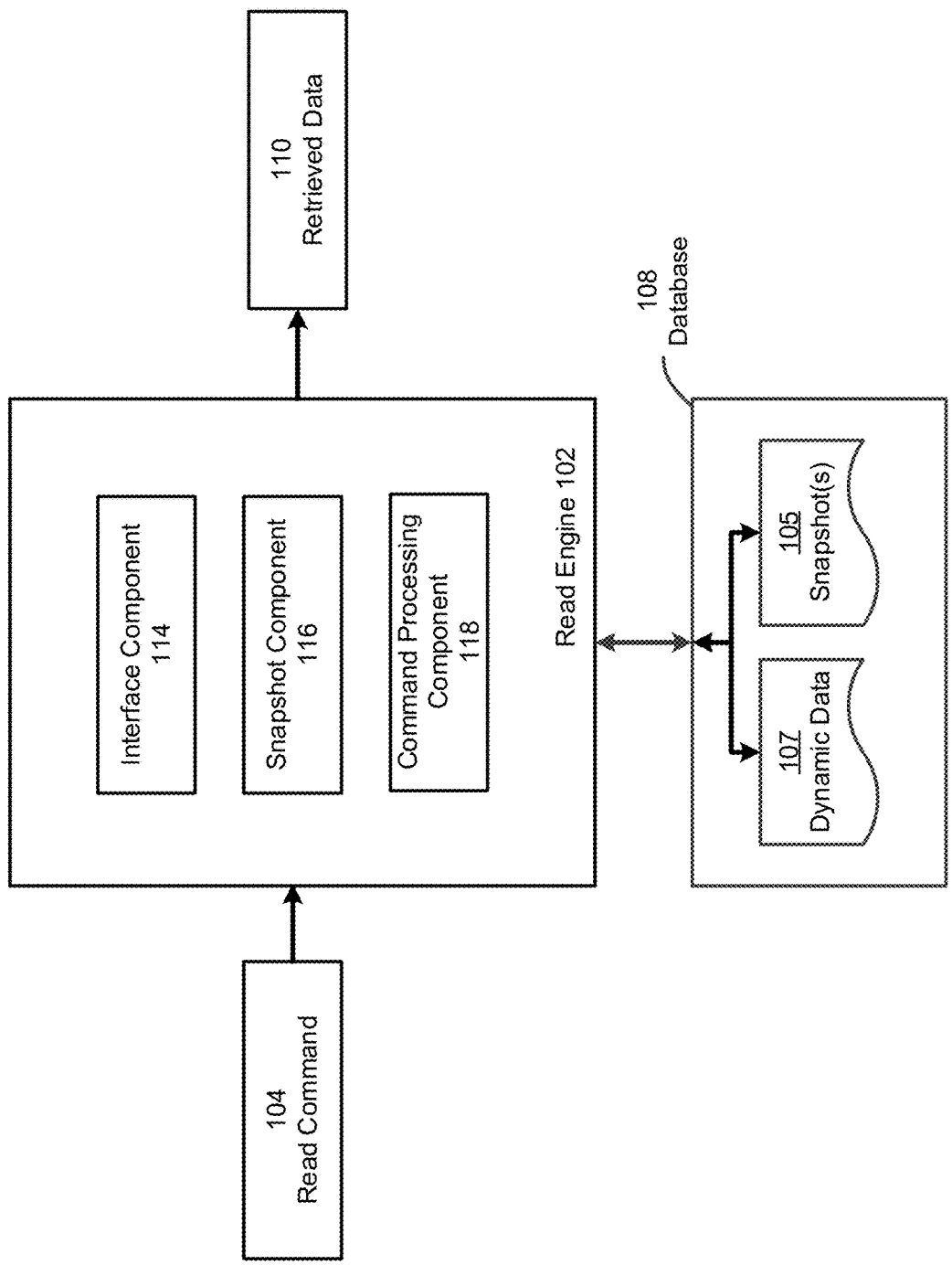
FIG. 1 illustrates a block diagram of an example read engine configured to process read commands, according to some embodiments.

According to one aspect, systems and methods are provided for reading from storage nodes in a database while replication is simultaneously processing writes. In some embodiments, the database may follow an eventual consistency model or other replication strategies and committed data may be data that has been replicated by more than a predetermined number of secondary nodes (e.g., half the secondary nodes) in the database. In these embodiments, data may be replicated from a primary node in the database to secondary nodes in the database over time. Thereby, one or more of the secondary nodes may have data that is not completely up-to-date relative to the primary node. The systems, as described herein according to some embodiments, provide clients an ability to read from a secondary node while data is being replicated from the primary node to the secondary node.

Typically, a database following an eventual consistency model is designed such that when you have sequences of writes on the primary node, each of the secondary nodes show the sequence of writes in the same order. For example, if you change field "A" in a document and then change field "B", it is not possible to see that document with changed field "B" and not changed field "A". The sequence of writes may be applied in the same order by, for example, applying the writes in batches to secondary nodes and blocking reads to those secondary nodes so that applications cannot see data applied in the "wrong" order (e.g., an out-of-sequence order).

Some systems lock the secondary nodes while they are applying a batch or writes to data. Locking the secondary nodes during batch writes increases the amount of time to process a read command. For example, the read latency is typically higher when reading from secondary nodes while a batch of writes is being applied because the read command must wait for the batch of writes to be applied before target data of the read command can be read. As the write load increases, the likelihood increases that secondary reads are subject to occasional "pauses", further impacting read latency. Further, the write latency may also be increased because a batch of writes may not be processed against a secondary node until all of the existing read commands have been processed to avoid changing data being retrieved in the middle of a read command.

Accordingly, aspects of the present disclosure relate to new techniques to process read commands against a secondary node while a batch of one or more write commands is simultaneously being applied to the secondary node (termed "non-blocking secondary reads"). Thus, the read latency on secondary nodes is decreased and the maximum throughput of the database is increased. In some embodiments, these techniques for non-blocking secondary reads leverage one or more snapshots of the data in a secondary storage node. Snapshots may be representative of the state of the data in the database at a particular point in time. The snapshots may be captured periodically or aperiodically. Thus, the snapshots present a static view of the data in the secondary storage node at a fixed point in time. According to some embodiments, the read requests may be processed against a snapshot of the data in the secondary storage node at a previous point in time while a batch of writes is being applied to the secondary storage node.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows an example read engine 102 according to some embodiments. The read engine 102 may be designed to process various received commands on a database 108, such as a read command 104. In some embodiments, the database 108 may include a plurality of nodes and can be configured to replicate data from primary node to one or more secondary nodes. In these embodiments, the primary node may handle commands that change the data stored in the database and the secondary nodes may: (1) replicate the changes to data made in the primary node over time; and (2) process read requests. Thereby, the secondary nodes may have data that is not completely up-to-date relative to the primary nodes. Committed data may include data that has been replicated to at least a predetermined number of secondary nodes in the database (e.g., at least half of the secondary nodes). As shown in FIG. 1, the database 108 may store, for example, dynamic data 107 that may be modified (e.g., via a write command) and/or snapshot(s) 105 that each represent a static view of the dynamic data 107 at a particular point in time. For example, the dynamic data 107 may be a current state of the data, and the snapshot(s) 105 may represent a previous state of the data. In some instances, a portion of the dynamic data 107 may be different from data in the snapshot(s) 105. In some instances, a portion of the dynamic data 107 may be the same as data in the snapshot(s) 105.

In some embodiments, the read engine 102 receives and processes read commands 104. The read engine 102 can be configured to process a read command 104 by determining whether a write command is being processed against target data of the dynamic data 107 in the database 108. The read engine 102 can be configured to: (1) read from the dynamic data 107 responsive to a determination that the write command is not being processing against the dynamic data 107; and (2) read from the snapshot(s) 105 responsive to a determination that a write command is being processed against the dynamic data 107. The read engine 102 can be configured to output the retrieved data 110 obtained from processing the read command 104.

As shown in FIG. 1, the read engine 102 includes an interface component 114. The interface component can be configured to receive and provide data to various systems, such as the database 108. In some embodiments, the interface component 114 can be configured to receive the read command 104 and provide the retrieved data 110 once the read command 104 has been processed by the read engine 102. In some embodiments, the interface component 114 can be configured to communicate with one or more client systems (also referred to as "clients"). The interface component 114 can be configured to receive read commands from the client. For example, the interface component 114 may include an application program interface (API) via which the interface component 114 receives read commands from the client. The API may allow client systems to submit read commands in one or more programming languages (e.g., Python and/or Java programming languages).

As shown in FIG. 1, the read engine 102 includes a snapshot component 116 to generate snapshots of data in the database 108. The snapshots are illustrative of the dynamic data 107 in the database 108 at a particular point in time. For example, the particular point of time may be a unique point in time on a logical clock. In some embodiments, the snapshot component 116 can be configured to generate a snapshot periodically. For example, the snapshot component 116 may generate a snapshot of the dynamic data 107 every 10 milliseconds and each snapshot may be representative of the data in the dynamic data 107 at the time the snapshot was taken. For example, the snapshots may be indicative of the data in a primary node and/or a secondary node at a particular point in time. The snapshots generated by the snapshot component 116 may provide a different view of the data in the dynamic data 107 that illustrates changes over time, and/or from node to node.

As described above, secondary nodes in the database 108 may include data that is not completely up-to-date relative to the primary node. Thereby, there is generally a delay between changes being made to the primary node and the changes being replicated in a requisite number of secondary nodes so as to be committed to the database 108. In some embodiments, the snapshot component 116 may identify a committed snapshot from the generated snapshots. In one example, the snapshot component 116 evaluates changes in state within the snapshots to determine if replication has occurred to a threshold number of nodes, if so the snapshot can be identified or labelled as a committed snapshot. In another example, a snapshot is only updated to include new data once the new data has been committed. Thus, in one implementation committed snapshots are only updated to include committed data.

A committed snapshot may be a latest snapshot of the database 108 that is representative of only committed data. Stated differently, the committed snapshot may be the most recent snapshot that only contains committed data. In some embodiments, the snapshot component 116 can be configured to update the snapshot that is the committed snapshot as the secondary nodes replicate changes made to the primary node. For example, the latest changes to the primary node that have been committed may be the changes made up to 12:30 pm on May 5, 2017. Subsequently, the secondary nodes may replicate data from the primary node and move the commit forward from 12:30 pm on May 5, 2017 to 2:00 pm on May 5, 2017. The snapshot component 116 may, in response, select a more recent snapshot as the committed snapshot. In some embodiments, the snapshot component 116 configured to remove one or more snapshots that are older than the new committed snapshot. Thereby, the snapshot component 116 updates which snapshot is the committed snapshot in tandem with the secondary nodes in the database 108 replicating the data from the primary node.

In some embodiments, the snapshot component 116 can be configured to generate and manage snapshots as described in U.S. patent application Ser. No. 15/605,141, entitled "METHOD AND APPARATUS FOR READING AND WRITING COMMITTED DATA", filed on May 25, 2017, which is incorporated herein by reference.

The read commands 104 may be processed by a command processing component 118 of the read engine 102. In some embodiments, the command processing component 118 may process read commands 104 by determining whether the dynamic data 107 is being modified (e.g., data is being written to the dynamic data 107). If the command processing component 118 determines that the dynamic data 107 is being modified, the command processing component 118 may process the read against one or more snapshots 105 to ensure that the retrieved data is consistent. In some embodiments, the command processing component 118 can be configured to process the read against the most recently captured snapshot 105. For example, the command processing component 118 may process the read against a committed snapshot designated by the snapshot component 116. If the command processing component 118 determines that the dynamic data 107 is not being modified, the command processing component 118 may process the read against the dynamic data 107 (instead of the snapshot(s) 105) to ensure that the most up-to-date data is retrieved. In turn, the command processing component 118 may output the retrieved data 110 (e.g., to another device).

Example Database Systems

Figure 2:
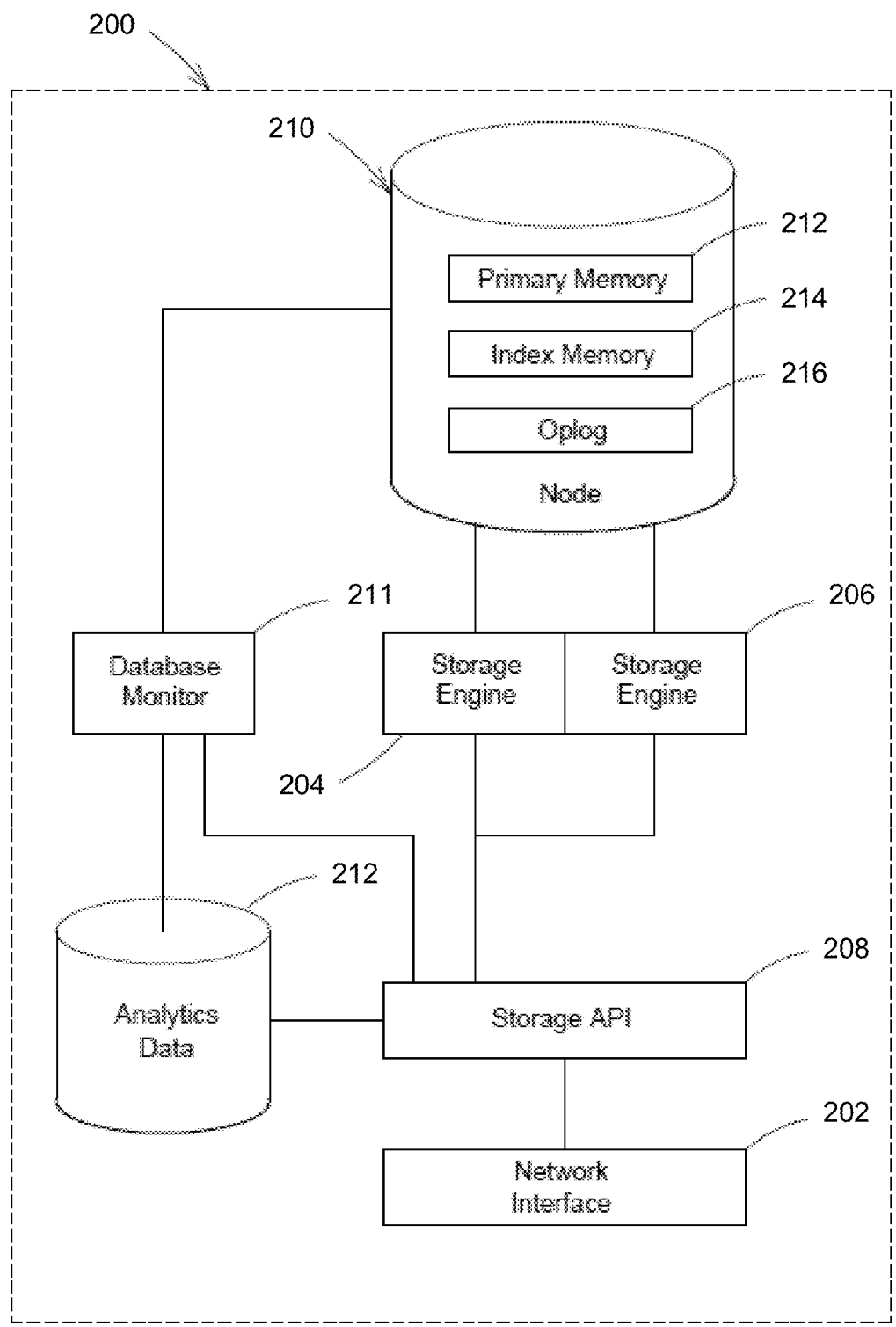
FIG. 2 illustrates a block diagram of an example distributed database system, according to some embodiments.

An example of a database subsystem 200 is shown in FIG. 2. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, entitled "METHOD AND APPARATUS FOR MAINTAINING REPLICA SETS", filed on Dec. 23, 2010, which is hereby incorporated by reference in its entirety. The database subsystem 200 includes a storage application. In one implementation described in greater detail below, a base unit of data is a document.

In some embodiments, the read engine 102 described above with reference to FIG. 1 may be a component of the database system 200. For example, the read engine 102 may receive read commands from a client to process against the database 210. In some embodiments, the database system 200 may be part of database 108 described above with reference to FIG. 1.

In some embodiments, a storage application programming interface (API) 208 receives database requests, including requests to perform read and write operations. When a write operation is requested, the storage API 208 in response selectively triggers a first storage engine 204 or a second storage engine 206 configured to store data in a first data format or second data format, respectively, in node 210. As discussed in more detail below, a database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine.

In one example, the database monitor 211 tracks the relative number of read and write operations performed on a collection within the database. In another example, the database monitor 211 is configured to track any operations (e.g., reads, writes, etc.) performed on any base unit of data in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 may be configured to store data in a row-store format, and the second storage engine 206 may be configured to store data in a LSM-tree format. In one example, the first storage engine 204 and/or the second storage engine 206 are configured store primary database data (i.e., the data being stored and queried) in a particular data format in the primary data memory 212, and may store database index data in a particular data format in index data memory 214. In one embodiment, the first storage engine 204 and/or the second storage engine 206 are configured store an oplog 216 in a particular data format. As discussed in more detail below, a database monitor 211 may track a number of analytics about the database, and the operations performed on it over time, and stores that information as analytics data 213.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 3:
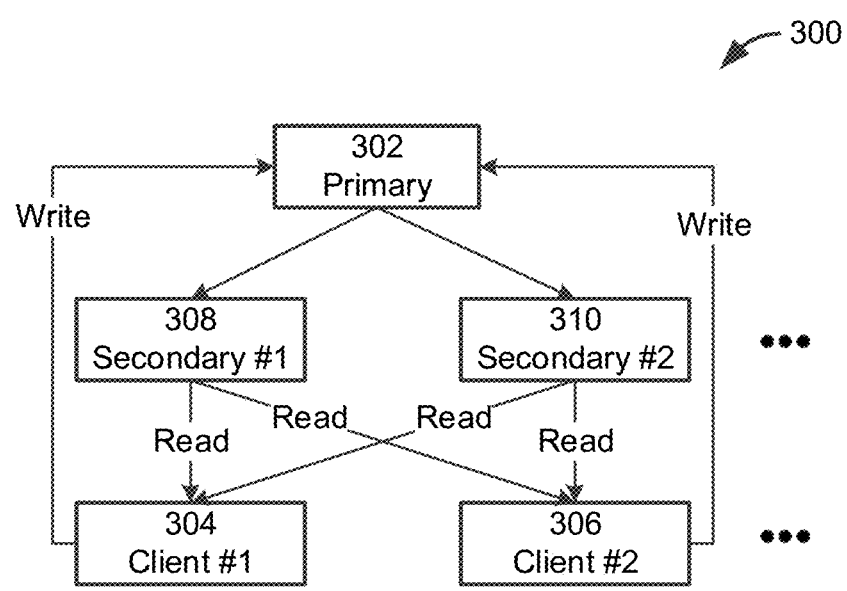
FIG. 3 illustrates a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 may be configured to store all of the documents currently in the database, and may be considered and treated as the authoritative version of the database in the event that any conflicts or discrepancies arise, as will be discussed in more detail below. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 may be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In some embodiments, the replica set primary node 302 only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In one example, the primary node 302 receives and performs client write operations and generates an oplog. Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In other embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, by restricting read requests. For example, read requests can be restricted to systems having up to date data, read requests can also in some settings be restricted to primary systems, among other options.

In some embodiments, both read and write operations may be permitted at any node (including primary node 302 or secondary nodes 308, 310) in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques known in the art. In other embodiments, read distribution can be managed based on a respective snapshot available at various nodes within a distributed database.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming >3 slave systems) client systems (e.g. 304, 306) request write operations: W(x=3); W(x=7); W(x=5). As the replication of the write requests occurs asynchronously, at some point all of the slave systems (e.g. 308, 310) will respond to a read request with 5. However, in the short term (during replication operations) client systems randomly reading from slaves can see [read operations designated by R (variable and actual value)]: R(x==7); R(x==0); R(x==5); and R(x==3). In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302.

In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical. Thus, when one or more nodes within a replica set 300 fail or otherwise become available for read or write operations, other nodes may change roles to address the failure. For example, if the primary node 302 were to fail, a secondary node 308 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

Figure 4:
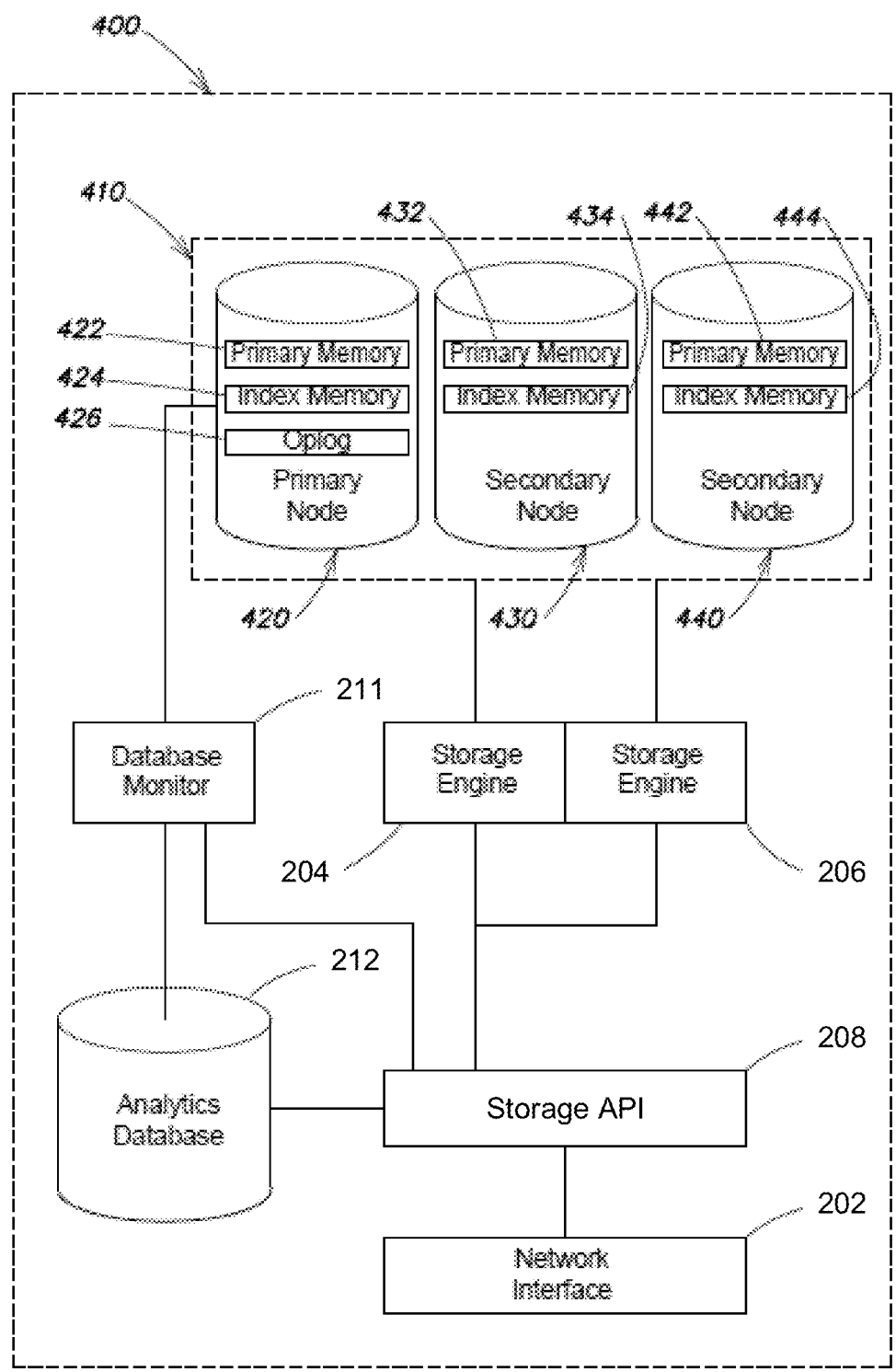
FIG. 4 illustrates a block diagram of another example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In some embodiments, the read engine 102 described above with reference to FIG. 1 may be a component of the database system 400. For example, the read engine 102 may receive read commands from a client to process against the database 410. In some embodiments, the database system 400 may be part of database 108 described above with reference to FIG. 1.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of nodes 420.

Figure 12:
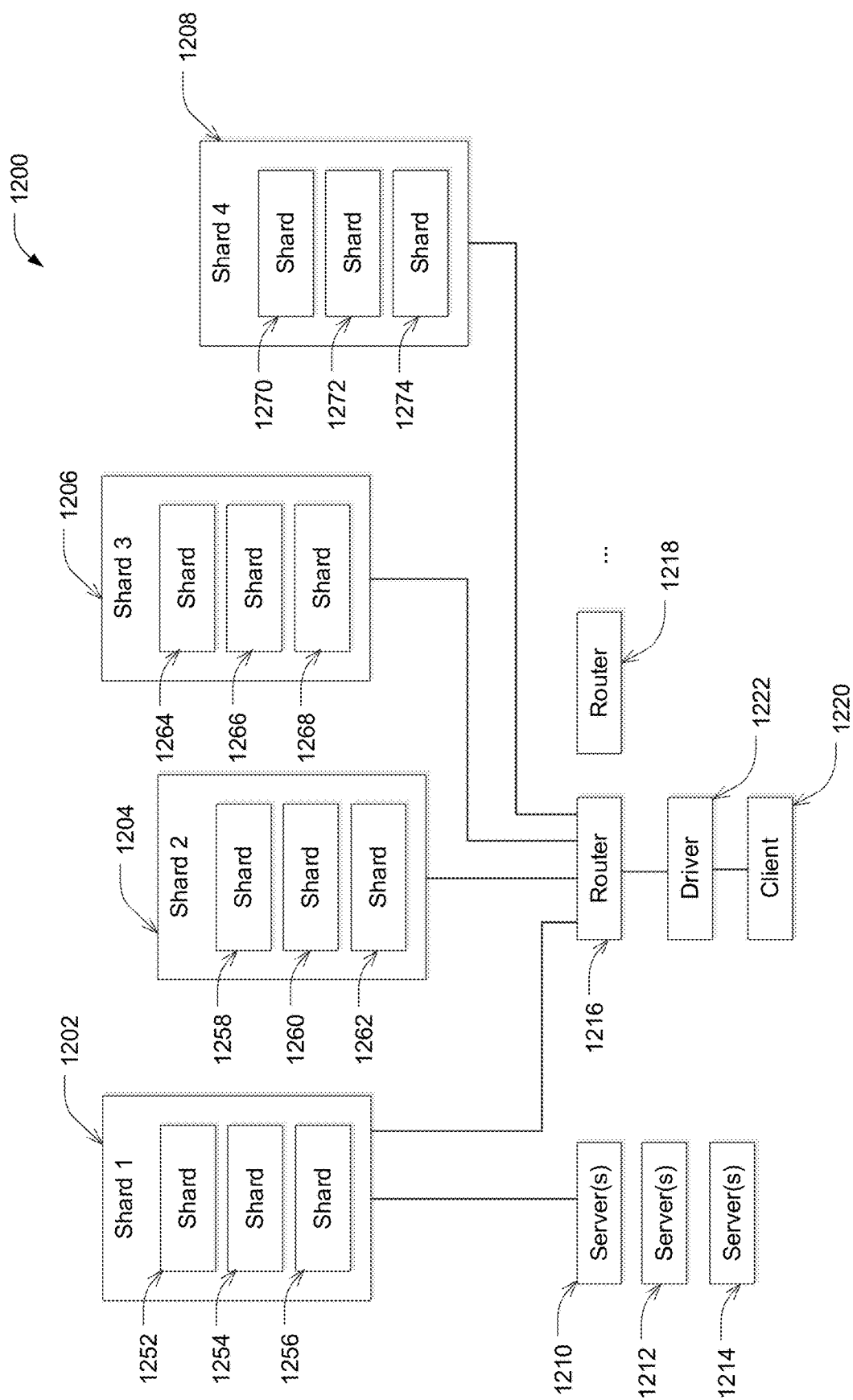
FIG. 12 is a block diagram of a sharded database system, according to some embodiments.

FIG. 12 shows a block diagram of an example architecture for a managed database system 1200, according to some embodiments of the present invention. The managed database system 1200 has been specially configured as a shard cluster. The shard cluster is the grouping of shards that collectively represent the data within the database. A shard cluster typically comprises multiple shard servers (e.g., 1202-1208) hosting multiple partitions (e.g., 1252-1274) or shards of data. The managed database system 1200 can include one or more configuration servers (e.g., 1210-1214) for metadata management, and shard router processes (e.g., 1216-1218). Metadata for the shard cluster can include, for example, information on the ranges of data stored in each partition, information associated with managing the shard cluster, partition counts, number of shard servers, data index information, partition size constraints, data distribution thresholds, among other options. In some embodiments, the database system 1200 includes a driver 1222 that receives submissions of transactions and/or operations from a client 1220. The driver 1222 can be configured to receive and handle submissions of transactions and/or operations from a client application. For example, the driver 1222 can be configured to receive one or more transactions from the client 1220, and command one or more of the shard servers of the database system 1200 to execute the transaction(s).

In some embodiments, the read engine 102 described above with reference to FIG. 1 may be a component of the database system 1200. For example, the read engine 102 may receive reads from the client 1220 and/or the driver 1222. In some embodiments, the database system 1200 may be part of database 108 described above with reference to FIG. 1.

In some embodiments, each shard of data (e.g., 1252-1274) can be configured to reside on one or more servers executing database operations for storing, retrieving, managing, removing and/or updating data. In some embodiments, a shard server (e.g., 1202-1208) contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. In some embodiments, collections are logical organizations of subsets of database data. In some embodiments, a collection can comprise one or more documents. A document can comprise a unit of data storage. The document can include one or more fields and one or more values stored in the field(s). In one example, a collection of documents is a named grouping of the data, for example, a named grouping of documents. The named grouping can be homogenous or heterogeneous. In some embodiments, collections are organizations of database data similar to relational database tables.

In some embodiments, configurations within a shard cluster can be defined by metadata associated with the managed database referred to as shard metadata. Shard metadata can include information about collections within a given database, the number of collections, data associated with accessing the collections, database key properties for a given collection, ranges of key values associated with a given partition, shard, and/or chunk of data within a given collections, to provide some examples.

In some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

In some embodiments, a chunk may have a maximum size. In some implementations, the maximum size can be predetermined. In some embodiments, the maximum size can be dynamically established. In some embodiments, a maximum size of 200 Mb establishes a good threshold that balances the costs of sharding (e.g., the computational burden associated with the copying/moving of the data and the versioning the chunks) against the improvement in processing by having sharded data. Some embodiments support compound shard keys/shard key patterns.

In some embodiments, the shard key should be selected to insure they are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to insure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values than a single key selection.

In some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from one of the BSON design goals: traversability. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but is much faster to parse.

Returning to FIG. 12, the three dots illustrated next to the system components indicate that the system component can be repeated. In some embodiments, adding additional shards, configuration servers, and/or shard routing processes can increase the capacity of the managed database system. The shard router processes 1216-1218 handle incoming requests (e.g., transactions and/or operations) from clients 1220 (e.g., applications, web services, user initiated requests, application protocol interfaces, etc). The router processes 1216-1218 are configured to provide a transparent interface to handle database requests. In particular, the client 1220 need not know that a database request is being served by a sharded database. The shard router processes receive client requests and route the database requests to one or more appropriate shards, e.g., 1252-1274 on shard servers 1202-1208.

In some embodiments, a router process, e.g., 1216, can be configured to operate as a routing and coordination process that makes the various components of the cluster look like a single system, for example, to client 1220. In response to receiving a client request (e.g., a write operation) via the driver 1222, the router process 1216 routes the request to the appropriate shard or shards. The shard(s) return any results to the router process. The router process 1216 can merge any results and communicate the merged result back to the driver 1222. The driver 1222 can use the results for additional processing and/or communicate results to the client 1220.

In some embodiments, a shard may be hosted by a replica set. The replica set may include a primary node and one or more secondary nodes. In some embodiments, each of the nodes of the replica set may be a separate shard server to provide redundancy, and protection against failures. In some embodiments, the primary node may perform write operations. The secondary node(s) may replicate write operations performed by the primary node to provide redundancy. In some embodiments, if the primary node is unavailable, the database system may be unable to perform a write operation. For example, if the primary node of a replica set hosting a shard shuts down, the database may be unable to execute the write operation on the shard during the period that the primary node is shut down, or until a new primary node is selected. In some embodiments, the driver 1222 can be configured to transmit one or more write commands to a primary node of a replica set to perform one or more write operations submitted by the client 1220. For example, the driver 1222 can be configured to connect to the primary node to transmit the write command(s) to the primary node to perform write operation(s) submitted by the client 1220.

In some embodiments, the router process 1216 is configured to establish current state information for the data distributed throughout the database by requesting metadata information on the database from the configuration server(s) 1210-1214. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 1216-1218, as needed. In one example, router processes 1216-1218 can be configured to poll the configuration servers(s) 1210-1214 to update their state information periodically. In others examples, router processes can be configured to poll the configuration servers(s) 1210-1214 to update their state information on a schedule, periodically, intermittently, and can be further configured to received updates pushed from the configuration server(s) 1210-1214 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 1216 can be configured without persistent state information. For example, at initiation the router process 1216 cannot fully route data requests until its state is updated with the metadata describing the distribution of data throughout the shards.

In some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

In some embodiments, configuration server(s) 1210-1214 are configured to store and manage the database's metadata. In some embodiments, the metadata includes basic information on each shard in the shard cluster including, for example, network communication information, server information, number of chunks of data, chunk version, number of shards of data, shard version, and other management information for routing processes, database management processes, chunk splitting processes, etc. According to some embodiments, chunk information can be the primary data stored by the configuration server(s) 1210-1214. In some examples, chunks are defined by a triple (collection, minKey, and maxKey) and the metadata stored on the configuration servers establishes the relevant values for a given chunk of data.

In some embodiments, each of the installed configuration server(s) has a complete copy of all the chunk metadata information for the managed database. According to one aspect, various replication strategies can be implemented to maintain consistency between configuration servers. In some embodiments, updates to configuration data stored on the configuration server can require additional processes for insuring consistency. For example, a two-phase commit operation, is used to ensure the consistency of the configuration data amongst the configuration servers. In another example, various atomic commitment protocols (ACP) are used to insure consistency of the database metadata on any configuration servers.

Example Techniques for Processing Read Commands

Figure 10:
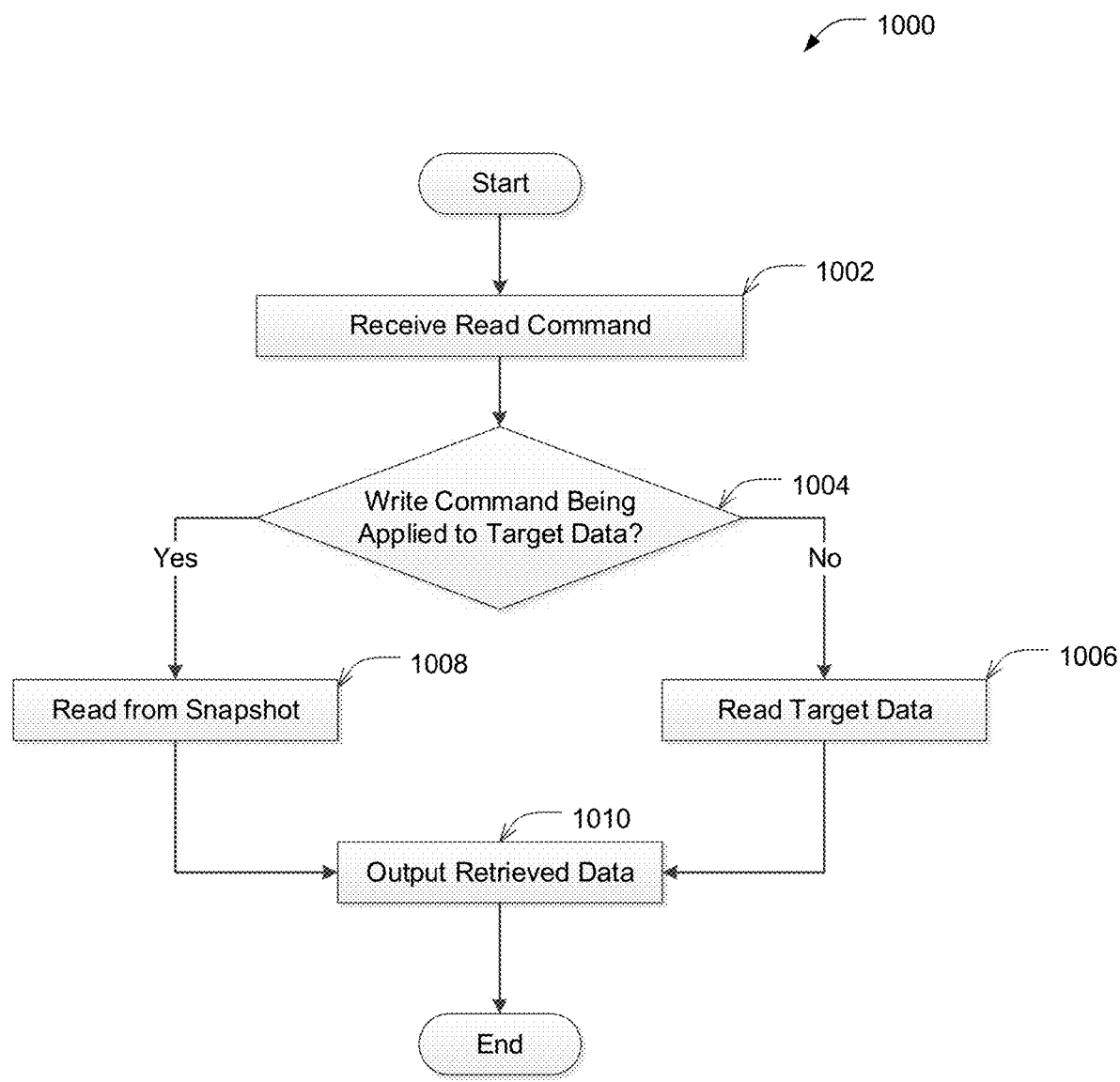
FIG. 10 is a flowchart of a process for processing a read command, according to some embodiments.

FIG. 10 shows a flow chart of an example process 1000 for processing a read command, according to some embodiments. Process 1000 may be performed by any suitable computer system such as read engine 102 described above with reference to FIG. 1.

Process 1000 begins at block 1002 where the system receives a read command. For example, the read engine 102 may receive a read command to read target data from the database 108. In some embodiments, the read command may be received from a client system. For example, the read command may be a query for inventory of a product received from an e-commerce website. As another example, the read command may be a query for a current account balance of an account submitted by a banking computer system. As yet another example, the read command may be a query for a current price of a product received from an e-commerce website.

In some embodiments, the read command may target data stored in the database. In some embodiments, the target data may be one or more documents stored in a collection. For example, a read command may target document(s) storing inventory information for respective product(s). As another example, a read command may target an account balance stored in a document associated with an account. In some embodiments, the target data may be one or more collections stored in the database. For example, the read command may target a collection of documents storing inventory information for various products. As another example, a read command may target a collection of documents storing account information for various bank accounts. In some embodiments, the target data may include one or more shards.

Next, process 1000 proceeds to block 1004 where the system determines whether there is a currently a write command currently being applied to the target data of the read command. In some embodiments, the system can be configured to determine whether there is currently write command being applied to the target data by determining whether the system is in the process of updating one or more documents of the target data. For example, the system may determine whether the document(s) are to be updated as part of the write command. As another example, the system may determine whether the document(s) of the target data are included in a collection that a write command is being applied to (e.g., by modifying documents in the collection or writing documents to the collection).

In some embodiments, the system can be configured to acquire a lock over data when applying the write command to the data. The lock may prevent other operations from accessing the data during application of the write command. The lock may prevent other write commands from being able to update the data and/or read commands from being able to retrieve the data. In some embodiments, the system can be configured to acquire a lock over one or more documents while applying a write command to the document(s). The lock may prevent: (1) other write commands from updating the document(s); and (2) read commands from retrieving data from the document(s). For example, while the system is updating a bank account balance for an account, the system may acquire a lock over a document storing the account balance. In this example, the system may acquire a lock over the document and, as a result, prevent other write commands from updating the document and prevent read commands from reading information from the document. In some embodiments, the system can be configured to acquire a lock over a collection while applying a write command to the collection. The lock may prevent: (1) other write commands from being applied to the collection; and (2) read commands from retrieving data from the collection.

In some embodiments, the system can be configured to determine whether a write command is being applied to target data of the read command received at block 1002 by determining whether the target data is locked. For example, the system may determine whether one or more documents targeted by the read command are currently locked for application of a write command to the document(s). As another example, the system may determine whether a collection targeted by the read command is currently locked for application of a write command to the collection.

If the system determines that there is not currently a write command being applied to the target data at block 1004, process 1000 proceeds to block 1006 where the system reads the target data. For example, the system may read the target data from dynamic data (e.g., dynamic data 107 stored in database 108). In some embodiments, the system can be configured to read data from an updated version of the target data. For example, the system may read from the most recently updated version of the target data. In some embodiments, the system can be configured to read the target data by accessing one or more documents or one or more collections of the dynamic data.

If the system determines that there is a write command being applied to the target data at block 1004, process 1000 proceeds to block 1008 where the system applies the read command to a snapshot. For example, the system may determine that a secondary node against which the read command is to be applied is in the process of replicating one or more write command from an oplog in a replica set of data hosted by the secondary node and, in response, applies the read command to a snapshot. The secondary node may be processing a write command on data including the target data of the read command. For example, the secondary node may be processing a write command on document(s) and/or collection(s) that are targeted by the read command.

In some embodiments, the system can be configured to maintain snapshots of data stored in the database. In some embodiments, a snapshot may represent data in a database at a particular point in time. In some embodiments, snapshot data may be committed (e.g., replicated by a majority of replica set members). In some embodiments, data in a snapshot may not be updated by write commands. The data in the snapshot may be a static representation of the data. In some embodiments, the system may not acquire locks over snapshot data. The system can be configured to process read commands against the snapshot without being locked out. Further, the system may obtain stable results from application of read commands to static snapshot data.

In some embodiments, a read command may be sent to a secondary node of a replica set. The secondary node may host a replica of a database hosted by a primary node. When the read command is applied on a secondary node of a replica set, the secondary node may have previously completed replication of one or more write commands on the target data. The system (e.g., snapshot component 116 of FIG. 1) may have stored a snapshot of the target data after replication of the write command(s). For example, the system may have stored the snapshot in response to changes from the write command(s) being applied to a predetermined number of nodes in the database (e.g., at least half of the nodes). In this example, the system may apply the read command to the snapshot of the data.

As another example, the secondary node may host a replica of a collection of documents. In this example, the secondary node may store a snapshot of the collection reflecting the state of the documents at a first time. The system may receive a read command that targets the collection at a second time subsequent to the first time. When the system determines that a write command is being applied to the collection of documents at the second time, the system may apply the read command to the snapshot stored at the first time.

In some embodiments, the system can be configured to apply the read command to a committed snapshot. As previously described, a committed snapshot may be a latest snapshot of data that represents only committed data. For example, the committed data may be the most recent snapshot for which a predetermined number of nodes (e.g., more than half of the nodes) have stored the version of the data. The system can be configured to apply the read command to the committed snapshot to read the most recent version of data without delaying a response to the read command as a result of a write command being applied to the target data.

After retrieving data at either block 1006 or 1008, process 1000 proceeds to block 1010 where the system outputs the retrieved data. In some embodiments, the system can be configured to output the retrieved data by transmitting the retrieved data to a client system. For example, the system may transmit the data via a network connection (e.g., to the Internet) to a client system. As another example, the system may provide a visualization of the retrieved data in a user interface. In some embodiments, the system can be configured to output an indication that the retrieved data was read from a snapshot when the data is read at block 1008. The indication may inform a recipient of the data (e.g., a client system) that there is a possibility that the data targeted by the read command has changed the retrieved data.

Figure 11:
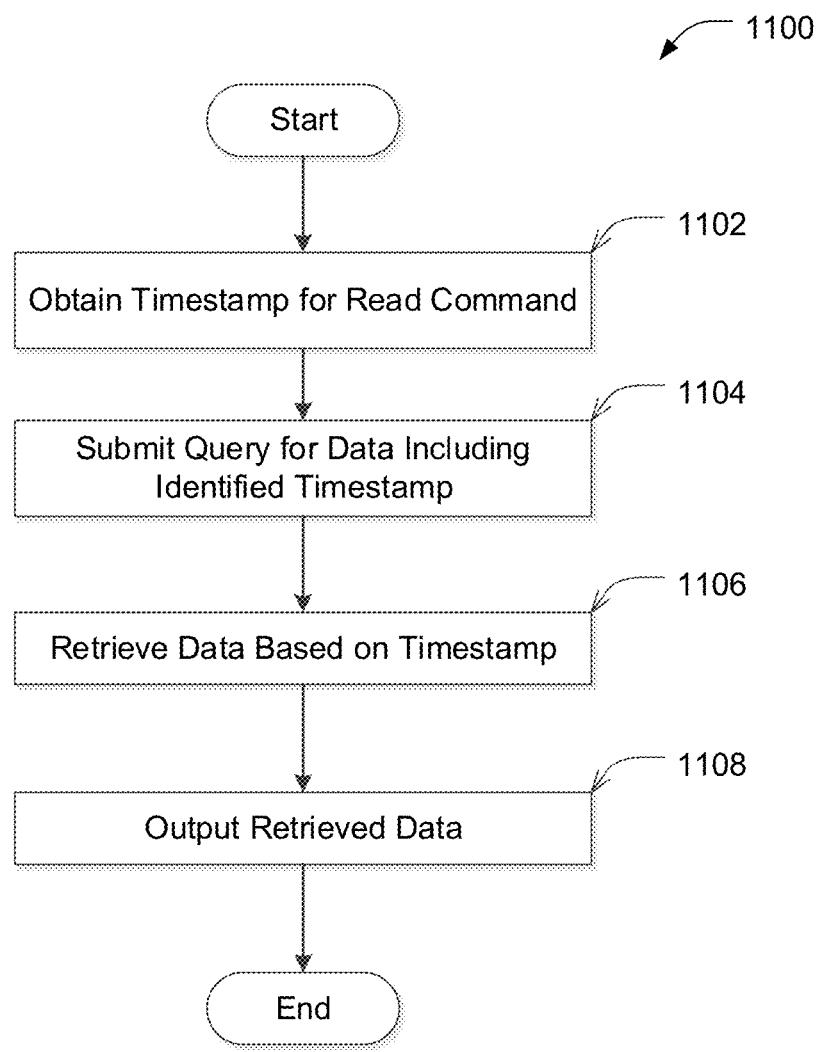
FIG. 11 is a flowchart of a process for applying a read command to a snapshot, according to some embodiments.

FIG. 11 shows a flowchart of an example process 1100 for applying a read command to a snapshot. Process 1100 may be performed by any suitable computer system such as read engine 102 described above with reference to FIG. 1.

Process 1100 begins at block 1102 where the system performing process 1100 obtains a timestamp for a read command. In some embodiments, the system can be configured to generate a timestamp for the read command. For example, the system may: (1) identify a current time (e.g., hour, minute, second, and/or date) at which the read command was received; and (2) generate the timestamp based on the identified current time. In some embodiments, the system can be configured to receive a timestamp. For example, a client system that submitted the read command may submit a timestamp with the read command.

Next, process 1100 proceeds to block 1104 where the system submits a query for the data including the obtained timestamp. For example, the system may submit the read command with a field indicating the time stamp. In some embodiments, the system can be configured to submit a read command as a document where a field of the document stores the obtained timestamp.

Next, process 1100 proceeds to block 1106 where the system retrieves the data based on the timestamp. In some embodiments, the system can be configured to retrieve the data based on the timestamp by identifying target data of the read command as it was at a time indicated by the timestamp. In some embodiments, the system can be configured to identify the most recent snapshot that precedes the timestamp associated with the data query. Thus the system may insure that the read command is being applied to the most recent committed version of the target data.

In some embodiments, the system can be configured to identify a snapshot to which to apply the read command from among a plurality of snapshots. The system can be configured to store the plurality of snapshots and timestamps associated with each snapshot. The timestamp may indicate a time at which the snapshot was generated. In some embodiments, the system can be configured to identify the snapshot by selecting one of the plurality of snapshots that has an associated timestamp that is closest to the timestamp included with the query. For example, the snapshot may be the most recently stored snapshot prior to receiving the read command.

In some embodiments, the system can be configured to retrieve the data by applying the read command to the identified snapshot. The system may apply the read command to the target data in the first state. The target data may include one or more documents, and the system may apply the read command to the document(s) as they are stored in the snapshot. For example, the system may retrieve values of one or more fields of the document(s) to retrieve the data.

After retrieving the data at block 1106, process 1100 proceeds to block 1108 where the system outputs the retrieved data (e.g., as performed at block 1010 described above with reference to FIG. 10). For example, the system may transmit the retrieved data to a client system that submitted the read command. As another example, the system may generate a visualization of the retrieved data.

Figure 8:
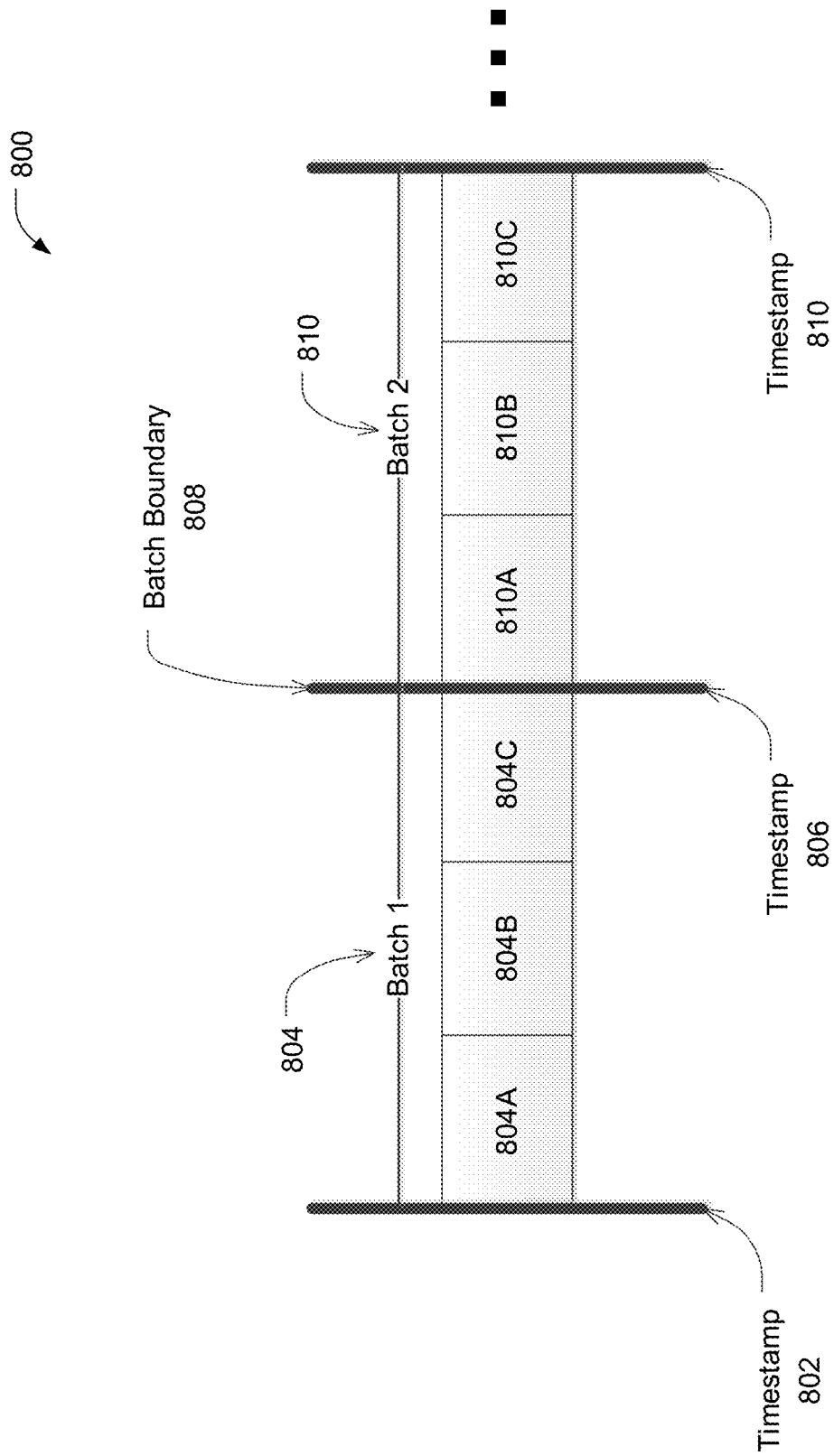
FIG. 8 is a state diagram showing an example set of batch write commands, according to some embodiments.

FIG. 8 shows an example application 800 of write commands (e.g., a batch of writes) to a node. For example, the application 800 of the batch of writes may be applied to a secondary node. As shown, the set of six writes 804A-C, and 810A-C is divided into two batches including a first batch 804 with writes 804A-C and a second batch 810 with writes 810A-C. When the batches are applied to a secondary node, the individual writes within the batch may be assigned to their own processing thread so as to be applied at least partially in parallel. As a result, the writes may not complete in sequential order. For example, write 804C may be completed before write 804B. Locking reads from a secondary node while a particular batch of writes is being applied removes the possibility of data being read where the writes have been processed out-of-sequence (e.g., reading data where only writes 804A and 804C have occurred in the first batch).

As illustrated in FIG. 8, consecutive batches may be separated by a batch boundary 808. In some embodiments, a batch boundary may be indicated by a timestamp. For example, the boundary between batch 1 804 and batch 2 810 may be marked by timestamp 806. In some embodiments, the oplog may store a timestamp marking a boundary between consecutive batches. For example, the oplog may store timestamp 806 to mark a boundary between the batch 1 804 writes 804A-C and the batch 2 810 writes 810A-C.

In some embodiments, the system can be configured to store a snapshot after a batch of writes has been applied to a predetermined number of nodes (e.g., at least half of the nodes of a replica set). For example, the system may generate and store a first snapshot after the writes 804A-C of batch 1 804 have been applied to the predetermined number of nodes. In some embodiments, the system can be configured to store a timestamp associated with the snapshot. The timestamp may indicate a time at which the first snapshot was generated and/or stored. As another example, after storing the first snapshot, the system may generate and store a second snapshot after the writes 810A-C of batch 2 810 have been applied to the predetermined number of nodes. In some embodiments, the system can be configured to store a timestamp associated with the snapshot. The timestamp may indicate a time at which the second snapshot was generated and/or stored.

In some embodiments, the system can be configured to store a snapshot periodically. A snapshot reflects one or more batches of writes that have been applied to a predetermined number of nodes during a period of time. For example, the system may store a snapshot every 10 ms. If batch 1 804 was applied during a 10 ms period, the system may store a snapshot including updates from the writes 804A-C. If batch 1 804 and batch 2 810 were both applied to a predetermined number of nodes during the 10 ms period, the system may store a snapshot including updates from the writes 804A-C and the writes 810A-C.

In some embodiments, a system can be configured to receive a read command while a write command is being applied (e.g., at a node where a read command is to be applied). The system may apply the read command to a snapshot in response to receiving the read command while the write command is being applied. For example, the system may have stored a snapshot including updates from batch 1 804 writes, and a node may receive a read command while applying batch 2 810 writes. In this example, the system may apply the read command to the snapshot including the updates from the batch 1 804 writes, but which does not include updates from the batch 2 810 writes.

Figure 9:
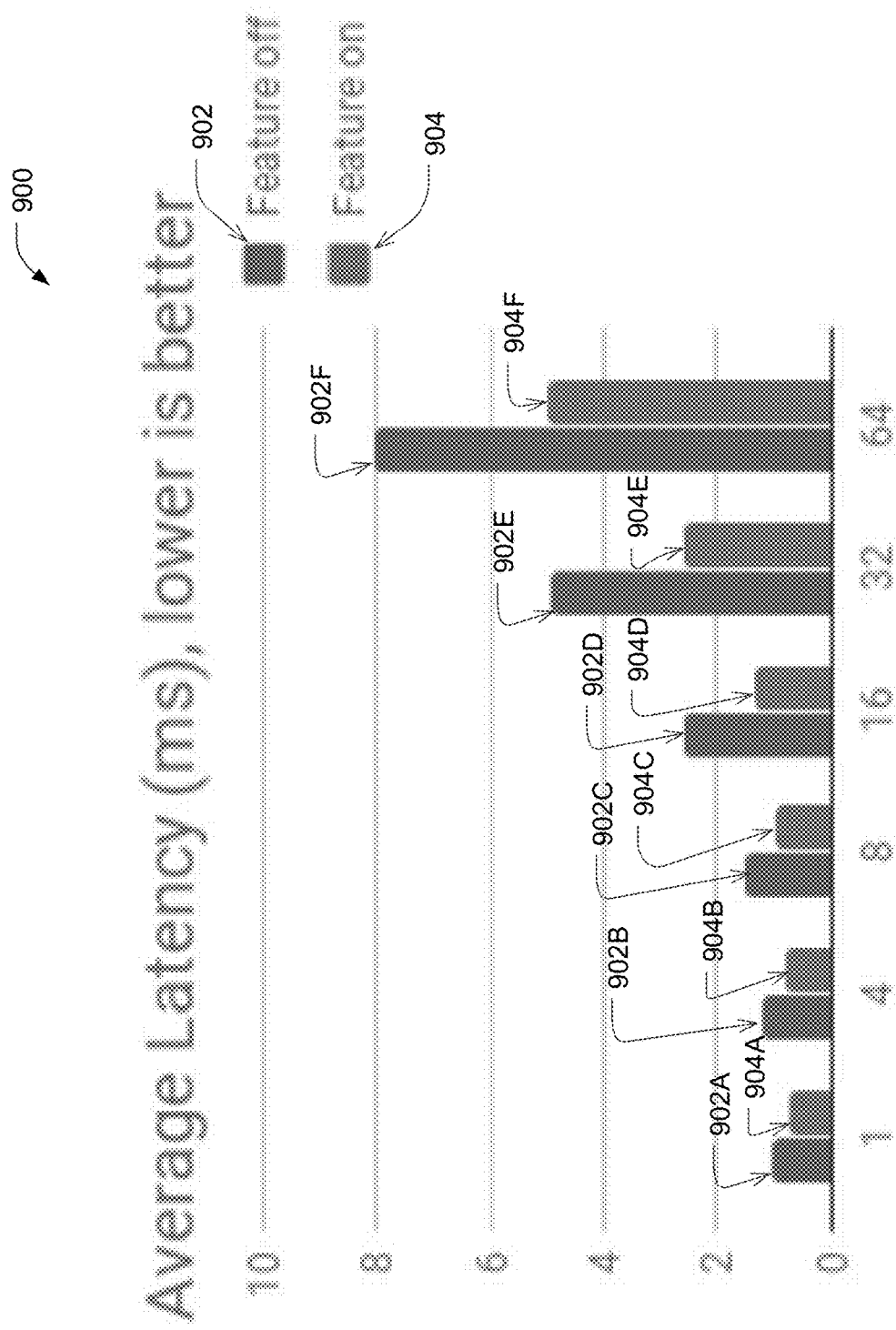
FIG. 9 is a graph showing the reduction in latency using non-blocking secondary reads, according to some embodiments.

FIG. 9 shows the performance improvement of the techniques described herein for non-blocking secondary reads. As shown, the reduction in latency may be up to fifty percent in cases where the write load is relatively high. As shown in FIG. 9, the bars labeled 902A-F indicate the average latency when the non-blocking secondary reads feature is turned off, and bars 904A-F indicate the average latency when the non-blocking secondary reads feature is turned on. Each of the bars 902A-F and 904A-F indicate the average latency with the feature turned off and on for various thread levels. For thread level 1, the average latency with the feature off 902A is approximately 1 ms while the average latency with the feature on 904A is approximately 0.5 ms. For thread level 4, the average latency with the feature off 902B is approximately 1 ms while the average latency with the feature on 904B is approximately 0.5 ms. For thread level 8, the average latency with the feature off 902C is approximately 1.5 ms while the average latency with the feature on 904C is approximately 0.7 ms. For thread level 16, the average latency with the feature off 902D is approximately 2.2 ms while the average latency with the feature on 904D is approximately 1 ms. For thread level 32, the average latency with the feature off 902E is approximately 5 ms while the average latency with the feature on 904E is approximately 2.5 ms. For thread level 32, the average latency with the feature off 902F is approximately 8 ms while the average latency with the feature on 904F is approximately 5 ms.

Further, as shown in the table below, the reduction in the 95 percentile latency in tests is significant. As shown in Table 1, the read latency is less than or equal to 1 ms for the $95^{th}$ percentile of read commands across thread levels of 8, 16, 32, and 64.

TABLE 1

| 95th percentile read latency in milliseconds (ms) | | | | |
|---|---|---|---|---|
| Thread Levels | 8 | 16 | 32 | 64 |
| Feature Off Latency | 1 | 2 | 3 | 5 |
| Feature On Latency | 0 | 1 | 1 | 0 |

Example Special-Purpose Computer System

A special-purpose computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 5:
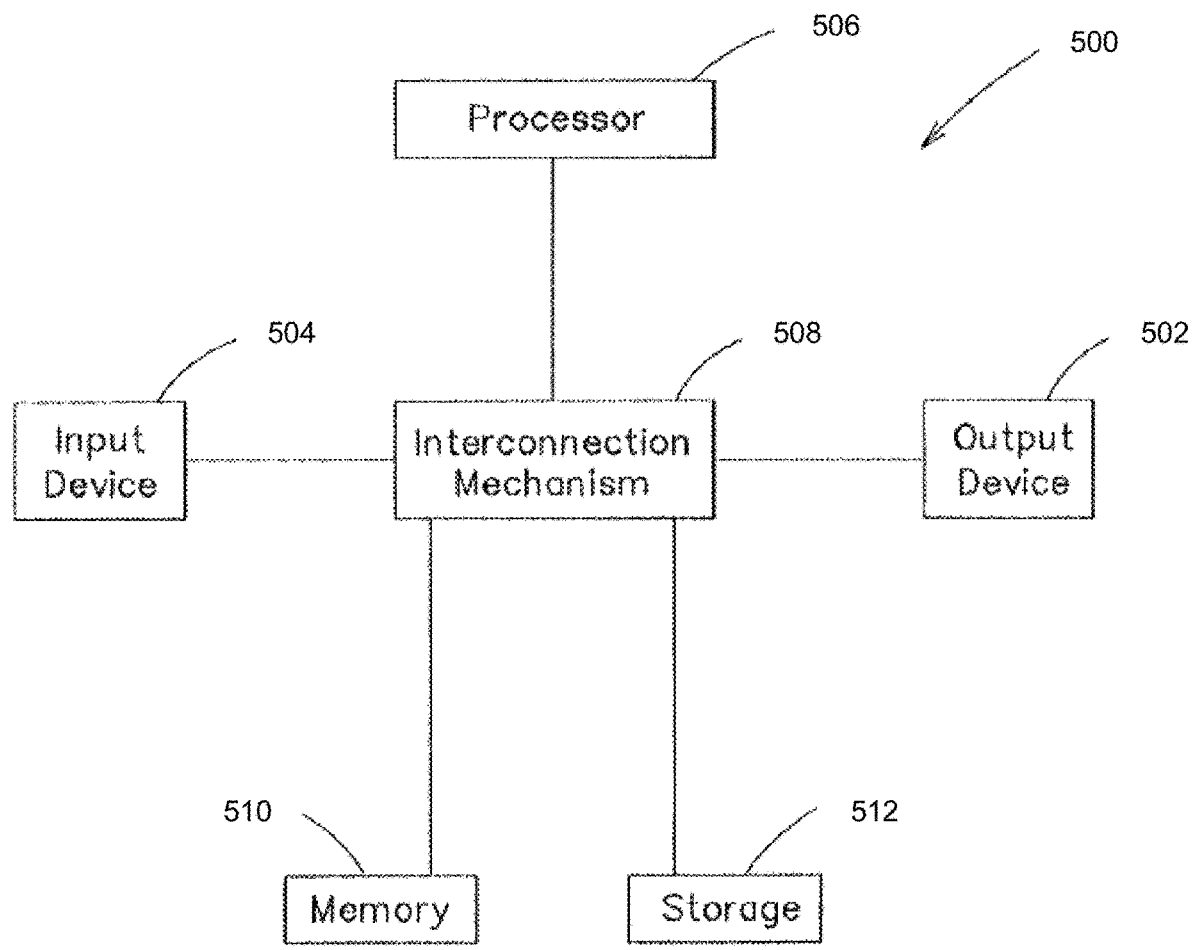
FIG. 5 is a block diagram of an example special-purpose computer system, according to some embodiments.

FIG. 5 shows a block diagram of an example special-purpose computer system 500 on which various aspects of the present invention can be practiced. For example, computer system 500 may include a processor 506 connected to one or more memory devices 510, such as a disk drive, memory, or other device for storing data. Memory 510 is typically used for storing programs and data during operation of the computer system 500. Components of computer system 500 can be coupled by an interconnection mechanism 508, which may include one or more busses (e.g., between components that are integrated within a same machine) and/or a network (e.g., between components that reside on separate discrete machines). The interconnection mechanism enables communications (e.g., data, instructions) to be exchanged between system components of system 500.

Computer system 500 may also include one or more input/output (I/O) devices 502-904, for example, a keyboard, mouse, trackball, microphone, touch screen, a printing device, display screen, speaker, etc. Storage 512, typically includes a computer readable and writeable nonvolatile recording medium in which computer executable instructions are stored that define a program to be executed by the processor or information stored on or in the medium to be processed by the program.

Figure 6:
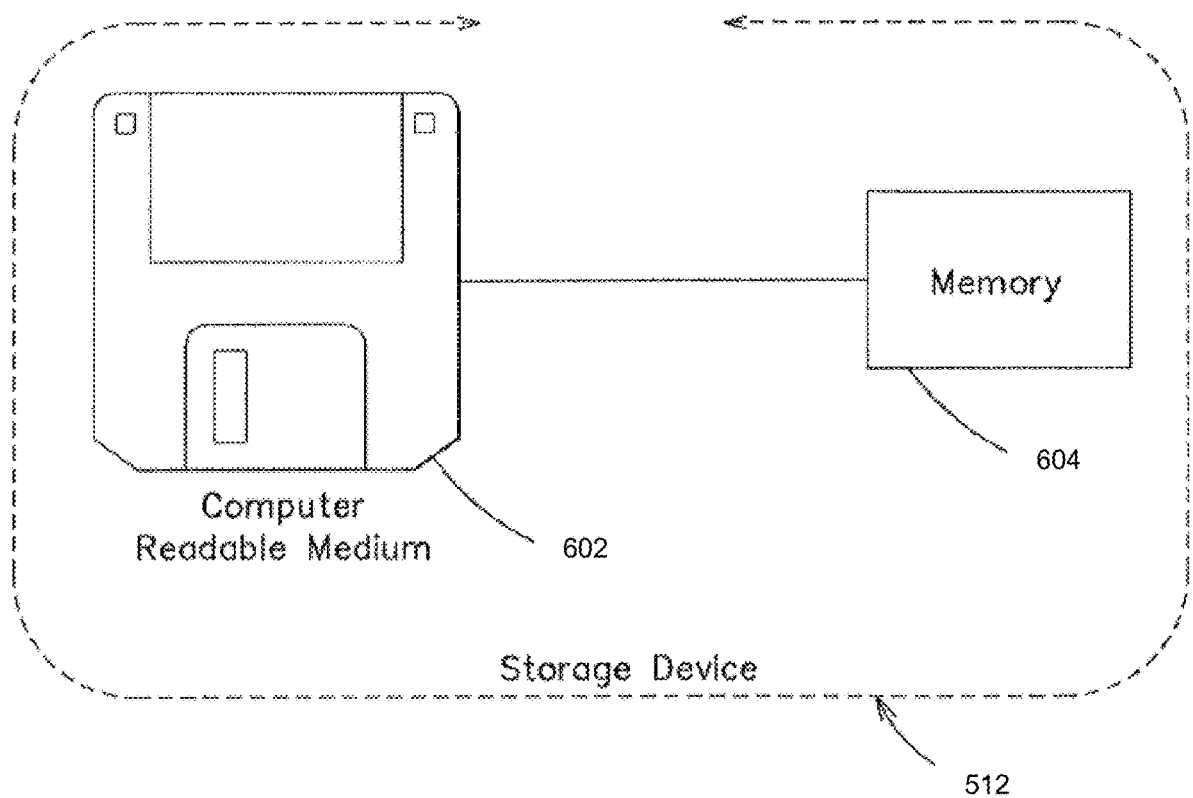
FIG. 6 is a block diagram of an example disk or flash memory, according to some embodiments.

The medium can, for example, be a disk 602 or flash memory as shown in FIG. 6. Typically, in operation, the processor causes data to be read from the nonvolatile recording medium into another memory 604 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 5, the memory can be located in storage 512 as shown, or in memory system 510. The processor 506 generally manipulates the data within the memory 510, and then copies the data to the medium associated with storage 512 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 9. Various aspects of the invention can be practiced on one or more computers having a different architectures or components than that shown in FIG. 9.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Figure 7:
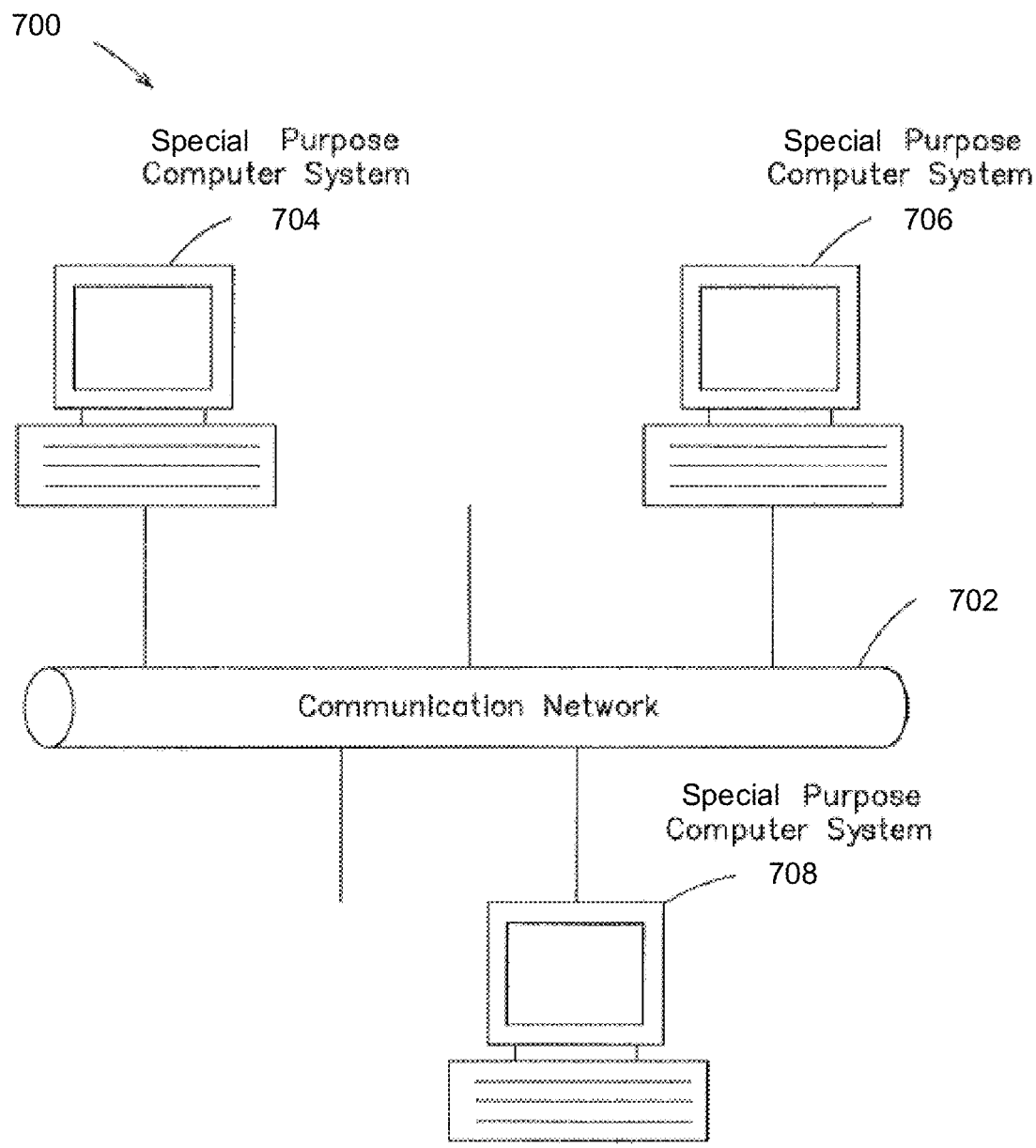
FIG. 7 is a block diagram of an example a distributed system, according to some embodiments.

Various aspects of this invention can be implemented by one or more systems similar to system 700 shown in FIG. 7. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 7, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 7 shows an architecture diagram of an example distributed system 700 suitable for implementing various aspects of the invention. It should be appreciated that FIG. 7 is used for illustration purposes only, and that other architectures can be used to facilitate one or more aspects of the invention.

System 700 may include one or more specially configured special-purpose computer systems 704, 706, and 708 distributed among a network 702 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
   a database comprising a plurality of data storage nodes, the plurality of data storage nodes including a primary data storage node and a plurality of secondary data storage nodes;
   at least one processor configured to execute a plurality of operations comprising:
      receiving at least one write command to write data to the database and at least one read command configured to read data from the database;
      generating a plurality of snapshots of data stored in a secondary data storage node of the plurality of secondary data storage nodes;
      applying the at least one write command to the secondary data storage node; and
      reading at least some data from a snapshot of the plurality of snapshots of data stored in the secondary data storage node, wherein at least part of the reading is performed in parallel with at least part of applying the at least one write command to the secondary data storage node.

2. The database system of claim 1, wherein the at least one processor is configured to identify a committed snapshot representative of data that has been replicated on a majority of the plurality of data storage nodes.

3. The database system of claim 2, wherein the at least one processor is configured to read the at least some data from the committed snapshot.

4. The database system of claim 1, wherein each snapshot of the plurality of snapshots corresponds to the data stored in the secondary data storage node at a unique point in time.

5. The database system of claim 1, wherein the database follows an eventual consistency model.

6. The database system of claim 5, wherein the primary data storage node includes an operation log and the secondary data storage nodes each including at least one processor configured to retrieve the operation log and replicate operations in the operation log.

7. The database system of claim 1, wherein the at least one processor is configured to lock at least a portion of data while applying the at least one write command to the secondary data storage node.

8. The database system of claim 1, wherein the at least one processor is configured to generate snapshots periodically.

9. The database system of claim 8, wherein the at least one processor is configured to generate a snapshot every 10 ms.

10. The database system of claim 1, wherein the at least one processor is configured to apply a write command by applying a batch of one or more write operations to data hosted by the secondary data storage node.

11. The database system of claim 10, wherein the at least one processor is configured to generate a snapshot representative of data where the batch of one or more write operations has been applied by a predetermined number of the plurality of data storage nodes.

12. A method of performing, by one or more processors, operations in a database comprising a plurality of data storage nodes, the method comprising:
receiving at least one write command to write data to the database and at least one read command configured to read data from the database;
generating a plurality of snapshots of data stored in a secondary data storage node of the plurality of secondary data storage nodes of the plurality of data storage nodes;
applying the at least one write command to the secondary data storage node; and
reading at least some data from a snapshot of the plurality of snapshots of data stored in the secondary data storage node, wherein at least part of the reading is performed in parallel with at least part of applying the at least one write command to the secondary data storage node.

13. The method of claim 12, further comprising identifying, by the one or more processors, a committed snapshot representative of data that has been replicated on a majority of the plurality of data storage nodes.

14. The method of claim 13, further comprising reading, by the one or more processors, at least some data from the committed snapshot.

15. The method of claim 12, further comprising associating, by the one or more processors, each of the plurality of snapshots with a timestamp.

16. A database system comprising:
at least one processor configured to execute a plurality of operations comprising:
receiving a read command to read at least some stored data;
generating a plurality of snapshots of data stored in a first data storage node of a plurality of data storage nodes;
determining whether data is being written to the first data storage node;
responsive to determining that data is not being written to the first data storage node, processing the read command at least in part by reading at least some data stored on the first data storage node; and
responsive to determining that data is being written to the first data storage node, processing the read command at least in part by reading at least some data from a snapshot of the plurality of snapshots of data stored in the first data storage node, wherein at least part of the reading is performed in parallel with at least part of writing data to the first data storage node.

17. The system of claim 16, wherein the at least one processor is configured to determine whether data is being written to the first data storage node by determining whether target data of the read command is locked.

18. The system of claim 16, wherein processing the read command by reading at least some data from a snapshot of the plurality of snapshots comprises reading the at least some data from a most recently generated snapshot.

19. The system of claim 16, wherein the at least one processor is configured to receive a plurality of read commands and is further configured to process the plurality of read commands by reading data from the snapshot in response to determining that data is being written to the first data storage node.

20. A method of performing, by one or more processors, operations in a database comprising a plurality of data storage nodes, the method comprising:
receiving a read command to read at least some stored data;
generating a plurality of snapshots of data stored in a first data storage node of the plurality of data storage nodes;
determining whether data is being written to the first data storage node; and
processing the read command at least in part by reading at least some data stored on the first data storage node responsive to determining that data is not being written to the first data storage node; and
processing the read command at least in part by reading at least some data from a snapshot of the plurality of snapshots of data stored in the first data storage node, wherein at least part of the reading is performed in parallel with at least part of writing data to the first data storage node, the processing being responsive to determining that data is being written to the first data storage node.

* * * * *